(12) United States Patent
Kim et al.

(10) Patent No.: US 12,441,944 B2
(45) Date of Patent: *Oct. 14, 2025

(54) METHOD AND DEVICE FOR REFINING WASTE PLASTIC PYROLYSIS OIL

(71) Applicants: SK Innovation Co., Ltd., Seoul (KR); SK Geo Centric Co., Ltd., Seoul (KR)

(72) Inventors: Yong Woon Kim, Daejeon (KR); Kyong Sik Park, Daejeon (KR); Min Woo Shin, Daejeon (KR); Jin Seong Jang, Daejeon (KR); Dong Keun Kim, Daejeon (KR); Joo Won Park, Daejeon (KR); Un Cheol Baek, Daejeon (KR); Byung Kook Ahn, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/441,386

(22) Filed: Feb. 14, 2024

(65) Prior Publication Data
US 2025/0051662 A1     Feb. 13, 2025

(30) Foreign Application Priority Data

Aug. 7, 2023   (KR) .................. 10-2023-0102880

(51) Int. Cl.
*C10G 67/02*  (2006.01)
*B01D 17/06*  (2006.01)
(Continued)

(52) U.S. Cl.
CPC ............ *C10G 67/02* (2013.01); *B01D 17/06* (2013.01); *B01J 27/051* (2013.01); *C10G 1/10* (2013.01);
(Continued)

(58) Field of Classification Search
None
See application file for complete search history.

(56) References Cited

U.S. PATENT DOCUMENTS 1,612,180 A  * 12/1926 Groote .................. C10G 33/02
                                                              516/190
3,935,295 A     1/1976 La Hue et al.
(Continued)

FOREIGN PATENT DOCUMENTS

| CN | 101613620 A | * 12/2009 | ............... C10G 1/10 |
| GB | 2580539 A | * 7/2020 | .............. C08J 11/18 |

(Continued)

OTHER PUBLICATIONS

Machine translation CN 101613620. Retrieved Apr. 18, 2024 (Year: 2024).*

*Primary Examiner* — In Suk C Bullock
*Assistant Examiner* — Alyssa L Cepluch
(74) *Attorney, Agent, or Firm* — The Webb Law Firm

(57) ABSTRACT

A method for refining waste plastic pyrolysis oil is provided, including: applying a voltage to a first mixed solution obtained by mixing waste plastic pyrolysis oil, washing water, and a demulsifier to dehydrate the first mixed solution to form a dehydrated first mixed solution; and hydrotreating a second mixed solution obtained by mixing the dehydrated first mixed solution dehydrated and a sulfur source to produce refined oil from which impurities have been removed, and a device related thereto. The method and device may prevent or minimize formation of an ammonium salt ($NH_4Cl$) and/or prevent adhesion of impurity particles in a refining process of waste plastic pyrolysis oil containing impurities such as chlorine and nitrogen, and provides waste plastic pyrolysis oil having low content of impurities and olefins and excellent quality, and thus, may be used as a (Continued)

feedstock for blending with existing petroleum products or oil refining and petrochemical processes.

19 Claims, 1 Drawing Sheet

(51) Int. Cl.
 *B01J 27/051* (2006.01)
 *C10G 1/10* (2006.01)
(52) U.S. Cl.
 CPC ............... *C10G 2300/1003* (2013.01); *C10G 2300/4012* (2013.01)

(56) References Cited

U.S. PATENT DOCUMENTS

| | | | |
|---|---|---|---|
| 2009/0000985 A1* | 1/2009 | Van Wees | C10G 7/003 208/81 |
| 2019/0211274 A1* | 7/2019 | Soliman | C02F 1/463 |
| 2022/0235276 A1 | 7/2022 | Paasikallio et al. | |

FOREIGN PATENT DOCUMENTS

| | | | | |
|---|---|---|---|---|
| KR | 1020220013363 A | 2/2022 | | |
| WO | 2021204820 A1 | 10/2021 | | |
| WO | WO-2021204819 A1 * | 10/2021 | | B01J 20/08 |
| WO | 2022084433 A1 | 4/2022 | | |
| WO | 2023279022 A1 | 1/2023 | | |

* cited by examiner

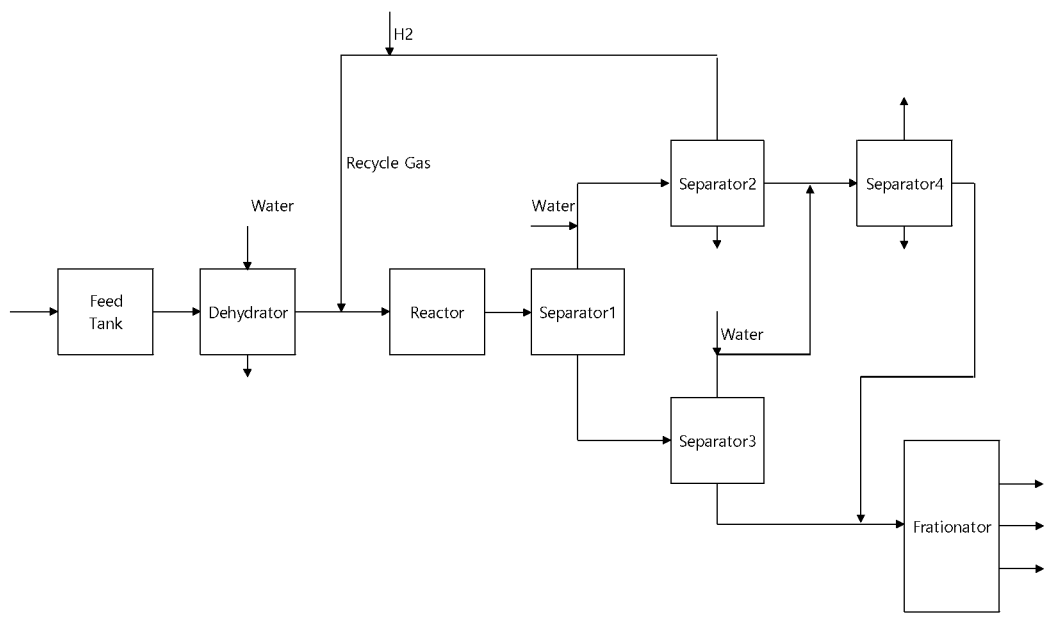

METHOD AND DEVICE FOR REFINING WASTE PLASTIC PYROLYSIS OIL

CROSS-REFERENCE TO RELATED APPLICATION

This application claims priority to Korean Patent Application No. 10-2023-0102880 filed Aug. 7, 2023, the disclosure of which is hereby incorporated by reference in its entirety.

BACKGROUND OF THE INVENTION

Field of the Invention

The present disclosure relates to a method and device for refining waste plastic pyrolysis oil.

Description of Related Art

Waste plastics, which are produced using petroleum as a feedstock, have a low rate of recycling, such as energy recovery in power generation, or mechanical recycling, and a significant amount of waste plastics is simply incinerated or landfilled. These wastes take a long time to degrade in nature, which causes contamination of the soil and serious environmental pollution. As plastic decomposes by exposure to sunlight and heat, the plastic waste releases greenhouse gases such as methane and ethylene. Incineration of plastic waste releases significant amounts of greenhouse gases (GHG), such as carbon dioxide, nitrous oxide and/or methane, into the environment. Carbon dioxide is the primary greenhouse gas contributing to climate change.

As a method for recycling waste plastics, there is a method for pyrolyzing waste plastics and converting the pyrolyzed waste plastics into usable oil, and the oil produced by pyrolyzing waste plastics in this way is called waste plastic pyrolysis oil.

However, pyrolysis oil obtained by pyrolyzing waste plastics may be blended in a limited amount with a high-value-added fuel such as gasoline or diesel oil because it has a higher content of impurities such as chlorine, nitrogen, and metals than oil produced from crude oil by a general method, and therefore, pyrolysis oil needs to go through a refining process to be used in large quantities.

As such, as a refining method for removing impurities such as chlorine, nitrogen, oxygen, and metals contained in waste plastic pyrolysis oil, a method of performing dechlorination/denitrification/deoxygenation by reacting waste plastic pyrolysis oil with hydrogen in the presence of a hydrotreating catalyst, a method of removing chlorine contained in waste plastic pyrolysis oil by adsorption using a chlorine adsorbent, or the like is known.

For example, U.S. Pat. No. 3,935,295 discloses a technology for removing chloride contaminants from various hydrocarbon oils. The technology is a conventional technology of hydrotreating oil in the presence of a hydrotreating catalyst in a first reactor, introducing a fluid containing hydrogen chloride (HCl) produced at this time and refined oil into a second reactor, and then removing a chlorine component contained in the fluid by adsorption using an adsorbent.

However, as described in the conventional technology, when oil is allowed to react with hydrogen in the presence of a hydrotreating catalyst, a chlorine compound such as hydrogen chloride produced with refined oil, and a nitrogen compound react with each other to form an ammonium salt ($NH_4Cl$), and the ammonium salt causes various process problems. Specifically, the ammonium salt formed inside the reactor by the reaction of oil and hydrogen not only causes corrosion of the reactor to reduce durability, but also causes various process problems such as occurrence of a differential pressure and a reduction in process efficiency therefrom. In addition, when the process is operated for a long period of time, impurity particles in the waste plastic pyrolysis oil adhere to the inside of the reactor, causing various process problems.

Therefore, there is a need for a method and device for refining waste plastic pyrolysis oil that may prevent or minimize formation of an ammonium salt ($NH_4Cl$) and may prevent impurity particles from adhering to the inside of a reactor in a refining process of waste plastic pyrolysis oil containing impurities comprising chlorine and nitrogen.

RELATED ART DOCUMENT

Patent Document

U.S. Pat. No. 3,935,295 (issue date: Jan. 27, 1976)

SUMMARY OF THE INVENTION

Some embodiments of the present disclosure are directed to providing a method and device for refining waste plastic pyrolysis oil that may minimize formation of an ammonium salt ($NH_4Cl$) in a refining process of waste plastic pyrolysis oil comprising impurities comprising chlorine and/or nitrogen.

Some embodiments of the present disclosure are directed to providing a method and device for refining waste plastic pyrolysis oil that have excellent refining efficiency and/or may implement a long-term operation because activity of a catalyst is maintained for a long time.

Some embodiments of the present disclosure are directed to providing a method and device for refining waste plastic pyrolysis oil that may prevent an adhesion phenomenon of impurity particles.

Some embodiments of the present disclosure are directed to providing a method and device for refining waste plastic pyrolysis oil, which has significantly low contents of impurities such as chlorine, nitrogen, oxygen, metals, and/or olefins, and has excellent quality, and thus, may be used as a feedstock for blending with existing petroleum products or oil refining and petrochemical processes.

In some embodiments, a method for refining waste plastic pyrolysis oil comprises: S1) applying a voltage to a first mixed solution obtained by mixing waste plastic pyrolysis oil, washing water, and a demulsifier to dehydrate the first mixed solution to form a dehydrated first mixed solution; and S2) hydrotreating a second mixed solution obtained by mixing the dehydrated first mixed solution dehydrated of step S1) and a sulfur source to produce refined oil from which impurities have been removed.

In some embodiments, in step S1), the waste plastic pyrolysis oil may be mixed in a greater volume than the washing water.

In some embodiments, in step S1), the waste plastic pyrolysis oil and the washing water may be mixed in the first mixed solution at a volume ratio of 1:0.001 to 0.5.

In some embodiments, in step S1), the waste plastic pyrolysis oil and the demulsifier may be mixed in the first mixed solution at a volume ratio of 1:0.000001 to 0.001.

In some embodiments, the voltage may be applied as an alternating current or a combination of an alternating current and a direct current.

In some embodiments, the voltage may be applied through a vertical electrode.

In some embodiments, the method for refining waste plastic pyrolysis oil may further comprise, after the application of the voltage in step S1), removing a rag layer from the first mixed solution.

In some embodiments, Step S1) may be performed under a temperature condition of 20° C. to 300° C.

In some embodiments, a ratio of a content of moisture in the waste plastic pyrolysis oil to a content of moisture in the dehydrated first mixed solution of step S1) may be 1:0.0001 to 0.9.

In some embodiments, in step S1), the dehydrated first mixed solution may be additionally dehydrated by cohesion of moisture.

In some embodiments, a weight ratio of nitrogen to chlorine in the second mixed solution may be 1:1 to 10.

In some embodiments, the sulfur source may comprise sulfur-containing oil.

In some embodiments, the sulfur-containing oil may be comprised in an amount of less than 0.5 parts by weight with respect to 100 parts by weight of the dehydrated first mixed solution dehydrated of step S1).

In some embodiments, the sulfur source may comprise one or two or more sulfur-containing organic compounds selected from a disulfide-based compound, a sulfide-based compound, a sulfonate-based compound, and/or a sulfate-based compound.

In some embodiments, the hydrotreating may be performed in the presence of a molybdenum-based hydrotreating catalyst.

In some embodiments, the molybdenum-based hydrotreating catalyst may be a catalyst in which a molybdenum-based metal, or a metal comprising one or two or more selected from nickel, cobalt, and/or tungsten and a molybdenum-based metal, are supported on a support.

In some embodiments, the molybdenum-based hydrotreating catalyst may comprise a molybdenum-based sulfide hydrotreating catalyst.

In some embodiments, the hydrotreating may be performed under a pressure condition of 50 bar to 150 bar.

In some embodiments, the method for refining waste plastic pyrolysis oil may further comprise, after step S2), subjecting a stream comprising the refined oil from which the impurities are removed to gas-liquid separation and then washing the gas-liquid separated stream with water.

Other features and aspects will be apparent from the following detailed description, the drawings, and the claims.

BRIEF DESCRIPTION OF THE DRAWINGS

FIG. 1 is a process diagram of a method for refining waste plastic pyrolysis oil according to an exemplary embodiment of the present disclosure.

DESCRIPTION OF THE INVENTION

The advantages and features of the present disclosure and methods for accomplishing them will become apparent from embodiments described herein in detail with reference to the accompanying drawings. However, the present disclosure is not limited to embodiments to be disclosed below, but may be implemented in various different forms. These embodiments will be provided only in order to make the present disclosure complete and allow those skilled in the art to recognize the scope of the present disclosure.

Unless defined otherwise, all terms (including technical and scientific terms) used in the present specification have the same meanings as commonly understood by those skilled in the art to which the present disclosure pertains. Unless the context clearly indicates otherwise, the singular forms of the terms used in the present specification may be interpreted as including the plural forms. As used herein, the singular form of "a", "an", and "the" include plural referents unless the context clearly states otherwise.

For the purposes of this specification, unless otherwise indicated, all numbers expressing quantities of ingredients, reaction conditions, dimensions, physical characteristics, and so forth used in the specification and claims are to be understood as being modified in all instances by the term "about." Unless indicated to the contrary, the numerical parameters set forth in the following specification and attached claims are approximations that can vary depending upon the desired properties sought to be obtained by the present invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

A numerical range used in the present specification includes upper and lower limits and all values within these limits, increments logically derived from a form and span of a defined range, all double limited values, and all possible combinations of the upper and lower limits in the numerical range defined in different forms. Unless otherwise specifically defined in the present specification, values out of the numerical range that may occur due to experimental errors or rounded values also fall within the defined numerical range. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

The expression "comprise(s)" described in the present specification is intended to be an open-ended transitional phrase having an equivalent meaning to "include(s)", "contain(s)", "have (has)", or "are (is) characterized by", and does not exclude elements, materials, or steps, all of which are not further recited herein.

The term "reactor" used in the present specification may refer to a device that may be used in processes such as production, refining, sorting, /or mixing of waste plastic pyrolysis oil. For example, the reactor may be interpreted to mean a device such as a dehydrator, a coalescer, a hydrotreating reactor, or a separator used in a refining process of waste plastic pyrolysis oil.

The term "vertical electrode" used in the present specification may refer to an electrode erected in a vertical direction with respect to the ground, and the term "horizontal electrode" may refer to an electrode laid horizontally with respect to the ground.

In some embodiments, a dehydration step comprising water washing, demulsification, voltage application, and the like is performed to reduce problems such as catalyst deactivation due to moisture dispersed in the form of an emulsion in waste plastic pyrolysis oil, and corrosion of a reactor due to chlorine contained in moisture and a low pH of moisture. In some embodiments, a hydrotreating step that may minimize formation of an ammonium salt, which causes various problems in a process of refining pyrolysis oil and oil refining and petrochemical processes using refined oil as a feedstock is performed. In some embodiments, the above series of sequential steps are combined, such that process stability may be secured, and high-quality refined waste plastic pyrolysis oil that may be used as a feedstock for blending with existing petroleum products, oil refining and/or petrochemical processes may be produced.

Hereinafter, method(s) and device(s) for refining waste plastic pyrolysis oil will be described in detail.

In some embodiments, a method for refining waste plastic pyrolysis oil is provided, the method comprising: S1) applying a voltage to a first mixed solution obtained by mixing waste plastic pyrolysis oil, washing water, and a demulsifier to dehydrate the first mixed solution to form a dehydrated first mixed solution; and S2) hydrotreating a second mixed solution obtained by mixing the dehydrated first mixed solution of step S1) and a sulfur source to produce refined oil from which impurities are removed.

Step S1) is a step of applying a voltage to a first mixed solution obtained by mixing waste plastic pyrolysis oil, washing water, and a demulsifier to dehydrate the first mixed solution to form a dehydrated first mixed solution.

Waste plastic pyrolysis oil contains moisture, and moisture in pyrolysis oil may cause problems such as deactivation of a hydrotreating catalyst and corrosion of a reactor. Since water-soluble impurities are contained in moisture, it is desirable to remove moisture. Moisture present in the form of an emulsion in waste plastic pyrolysis oil may be easily removed by performing step S1).

In some embodiments, the waste plastic pyrolysis oil may be a mixture of hydrocarbon oils produced by pyrolyzing waste plastics, and in this case, the waste plastics may comprise solid or liquid wastes related to synthetic polymer compounds such as waste synthetic resins, waste synthetic fibers, waste synthetic rubber, and/or waste vinyl.

In some embodiments, the waste plastic pyrolysis oil may comprise impurities such as at least one of a chlorine compound, a nitrogen compound, an oxygen compound, a metal compound, and/or char-derived particles. Alternatively or additionally, in some embodiments waste plastic pyrolysis oil may comprise impurities in the form of compounds in which chlorine, nitrogen, oxygen, and/or a metal is bonded to hydrocarbons, and may comprise paraffinic, olefinic, naphthenic, and/or aromatic hydrocarbons. In some examples, the waste plastic pyrolysis oil may comprise up to 3000 ppm or more of nitrogen, up to 2000 ppm or more of chlorine, up to 500 ppm or more of sulfur, up to 2 wt % or more of oxygen, up to 300 wtppm or more of metal, up to 1000 wtppm or more of char-derived particles, up to 40 vol % (based on 1 atm and 25° C.) or more of olefins, and/or up to 5 vol % (based on 1 atm and 25° C.) or more of conjugated diolefins, but a content of the impurities is merely a specific example that may be comprised in the waste plastic pyrolysis oil, and a composition of the waste plastic pyrolysis oil is not limited thereto.

In some embodiments, the washing water may serve to increase the probability of contact between emulsion-type moisture present in the waste plastic pyrolysis oil. In some embodiments, a basic compound may be added to the washing water to remove a water-soluble acidic material contained in moisture, and the basic compound may be sodium hydroxide (NaOH), but is not particularly limited. In some embodiments, the waste plastic pyrolysis oil may be mixed in a greater volume than the washing water, or the waste plastic pyrolysis oil and the washing water may be mixed in the first mixed solution at a volume ratio of 1:0.001 to 0.5, or 1:0.005 to 0.4, or 1:0.01 to 0.3. When the volume ratio satisfies the above range, water washing may be sufficiently performed, and thus, impurities in the pyrolysis oil may be significantly reduced, and costs required to remove washing water to be mixed may be minimized.

In some embodiments, the demulsifier may be one or a mixture of two or more selected from the group consisting of polyethylene glycol, tert-butanol, acetone, alkylnaphthalene sulfonate, alkylbenzene sulfonate, a nonionic alkoxylated alkyl phenol resin, polyalkylene oxide, polyoxyethylene sorbitan ester and mixtures thereof, but is not limited thereto.

In some embodiments, in the first mixed solution, the waste plastic pyrolysis oil and the demulsifier may be mixed at a volume ratio of 1:0.000001 to 0.001, or 1:0.000002 to 0.0005, or 1:0.000003 to 0.0001. When the volume ratio satisfies the above range, the emulsion may be decomposed with minimal impact on the quality of pyrolysis oil.

In some embodiments, the demulsifier may have a weight average molecular weight of 200 to 2,000 grams/mole, or 300 to 1,000 grams/mole, or 400 to 800 grams/mole. When the weight average molecular weight satisfies the above range, it is easy to mix the demulsifier with the waste plastic pyrolysis oil and the washing water under conditions where the dehydration process is performed, and thus, the decomposition efficiency of the moisture emulsion is increased.

The moisture in the form of an emulsion comprised in the first mixed solution in which the waste plastic pyrolysis oil, the washing water, and the demulsifier are mixed is still difficult to remove because it is stable. Therefore, a voltage may be applied to the first mixed solution to facilitate removal of moisture.

In some embodiments, the voltage may be applied as an alternating current or a combination of an alternating current and a direct current. Some impurity particles comprised in the waste plastic pyrolysis oil have polarities, and therefore, when a direct current voltage is applied, polarized impurity particles are accumulated on a specific electrode, and when the process is performed for a long period of time, the impurities may adhere to the electrode. However, when an alternating current voltage is applied, the polarity of the electrode changes periodically, and therefore, the adhesion phenomenon of the impurity particles may be prevented. In some embodiments, a frequency of the alternating current may be a single frequency or a combination of two or more frequencies. In some embodiments, in the case of the single frequency, an alternating current with a frequency of 60 Hz may be applied, and in the case of the combination of two or more frequencies, alternating currents with frequencies of 50 Hz and 60 Hz may be applied alternately, but the present disclosure is not limited thereto.

In some embodiments, the voltage may be applied through a vertical electrode. In some embodiments in which the impurity particles are accumulated on the electrode during a mixed solution preparation process or a voltage application process, when the impurities particles are not artificially washed, the impurity particles may adhere to the electrode after a long period of time. However, when a vertical electrode is used, the adhesion phenomenon of the impurity particles may be prevented in advance because the impurity particles are not accumulated on the electrode but fall to the bottom of the reactor due to gravity even without an additional washing operation.

In some embodiments, the magnitude of the voltage according to an exemplary embodiment of the present disclosure may be 0.1 to 50 kV, or 1 to 30 kV, or 5 to 20 kV, but is not limited thereto.

In some embodiments, the dehydration may be performed by any method known in the art. As a non-limiting example, after the application of the voltage, water may be removed by draining a water layer which is oil-water separated. Water may also be removed in a gas-liquid separator.

Metal impurities in the waste plastic pyrolysis oil stabilize the emulsion, hinder oil-water separation, and help form a stable emulsion layer, commonly called a rag layer. Such a rag layer may be formed between a desalinated oil layer at an upper portion of the first mixed solution and a water layer at a lower portion of the first mixed solution, and may gradually thicken during a continuous dehydration process. In some embodiments, an excessively thickened rag layer may be discharged to an equipment at the hydrotreating step together with the desalinated oil. This reduces the desalination effect of the desalinated oil and reduces the efficiency of the process. In some embodiments, the rag layer may be discharged together with water and may cause problems in a wastewater treatment process. Therefore, it is preferable to remove the rag layer formed between the desalinated oil layer and the water layer.

In some embodiments, the method for refining waste plastic pyrolysis oil may further comprise, after the application of the voltage in step S1), removing a rag layer from the first mixed solution. In some embodiments, the removal of the rag layer may be performed through a pipe penetrating through a wall of a dehydrator and connected to the outside after measuring a change in density of the mixed solution by a density meter in the dehydrator to determine a formation location and a thickness of the rag layer, but is not limited thereto.

In some embodiments, in step S1), after dehydrating the first mixed solution, the dehydrated first mixed solution may be additionally dehydrated by condensation of moisture.

In some embodiments, the additional dehydration may be performed by supplying the dehydrated first mixed solution to a coalescer. In some embodiments, the residual moisture contained in the dehydrated first mixed solution may be removed through condensation by a collection filter in the coalescer, but this is only an example and the present disclosure is not limited thereto. As the content of moisture in the waste plastic pyrolysis oil is further reduced through the additional dehydration, deactivation of the catalyst due to moisture may be prevented, and/or the process stability and the quality of refined oil may be improved.

In some embodiments, a ratio of a content of moisture in the waste plastic pyrolysis oil to a content of moisture in the dehydrated first mixed solution according to an exemplary embodiment of the present disclosure may be 1:0.0001 to 0.9, or 1:0.0005 to 0.5, or 1:0.001 to 0.1. When the ratio satisfies the above range, a risk of trouble occurring in subsequent processes such as hydrotreating may be significantly reduced, and high-quality refined oil that meets specifications may be produced as a feedstock for blending or oil refining and petrochemical processes, but the present disclosure is not limited thereto.

In some embodiments, step S1) may be performed at a pressure of 50 bar or less. When step S1) is performed at a pressure of 50 bar or less, moisture in the pyrolysis oil may be easily removed, and the process stability may be secured. In some embodiments, step S1) may be performed at a pressure of 30 bar or less, or 20 bar or less, and without limitation, 5 bar or more.

In some embodiments, the step S1) may be performed at a temperature of 20° C. to 300° C. When the temperature satisfies the above range, the decomposition of the emulsion and the condensation of moisture are smoothly performed, and thus, the dehydration efficiency may be improved. In some embodiments, step S1) may be performed at a temperature of 50° C. to 250° C., or 80° C. to 200° C.

In some embodiments, in order to improve the dehydration efficiency in step S1), one or more additional processes selected from the group consisting of centrifugation and distillation may be performed before and/or after the dehydration. The additional processes described above may be performed by a method known in the art, but are not particularly limited.

The step S2) is a step of hydrotreating a second mixed solution obtained by mixing the dehydrated first mixed solution of step S1) and a sulfur source to produce refined oil from which impurities are removed.

In some embodiments, the second mixed solution may have a concentration of chlorine (Cl) of 10 ppm or more, or 100 ppm or more, or 200 ppm or more, and without limitation, 3,000 ppm or less as an upper limit, but is not limited thereto.

In some embodiments, in the second mixed solution, a weight ratio of nitrogen to chlorine may be 1:0.1 to 10, or 1:0.5 to 5, or 1:1 to 2, but the above weight ratio is only an example of what may be comprised in the waste plastic pyrolysis oil, and a composition of the waste plastic pyrolysis oil is not limited thereto.

In some embodiments, the hydrotreating may be performed under a condition in which a ratio of hydrogen to the second mixed solution may be 100 $Nm^3$ (or $Sm^3$) to 5,000 $Nm^3$ (or $Sm^3$), or 500 $Nm^3$ (or $Sm^3$) to 3,000 $Nm^3$ (or $Sm^3$), or 1,000 $Nm^3$ (or $Sm^3$) to 1,500 $Nm^3$ (or $Sm^3$). When this is satisfied, impurities may be effectively removed, the high activity of the hydrotreating catalyst may be maintained for a long period of time, and/or the process efficiency may be improved.

The sulfur source refers to a sulfur source capable of supplying a sulfur component during the refining process, preferably in a continuous manner.

In some embodiments, in step S2), the second mixed solution comprising the sulfur source is prepared, such that during the refining process, deactivation of a molybdenum-based hydrotreating catalyst due to lack of the sulfur source and high-temperature operation may be suppressed, and the catalytic activity may be maintained.

In some embodiments, the sulfur source may comprise sulfur-containing oil. The sulfur-containing oil refers to oil comprised of hydrocarbon(s) comprising sulfur obtained from crude oil as a feedstock. The sulfur-containing oil is not particularly limited as long as it is oil comprising sulfur, and the sulfur-containing oil may be, for example, light gas oil, straight-run naphtha, vacuum naphtha, pyrolysis naphtha, straight-run kerosene, vacuum kerosene, pyrolysis kerosene, straight-run gas oil, vacuum gas oil, pyrolysis gas oil, sulfur-containing waste tire oil, and/or any mixture thereof.

In some embodiments, when waste tire oil is comprised as the sulfur-containing oil, a high content of sulfur contained in waste tires may be converted into oil together with hydrocarbons and may preferably serve as a sulfur source for the waste plastic pyrolysis oil. In some embodiments, using waste tire oil as at least part, or all, of the sulfur source for the waste plastic pyrolysis oil is advantageous in terms of reducing the environmental load due to recycling of waste tires and maintaining the catalytic activity for a long period of time.

In some embodiments, the, the sulfur-containing oil may be light gas oil (LGO) with a specific gravity of 0.7 to 1. When this sulfur-containing oil is used, the sulfur-containing oil may be uniformly mixed with the dehydrated first mixed solution, and high hydrotreating efficiency may be exhibited. In some embodiments, the, the specific gravity may be 0.75 to 0.95, or 0.8 to 0.9. The sulfur-containing oil may comprise 100 ppm or more of sulfur. When the sulfur component is comprised in an amount of less than 100 ppm, a content of the sulfur component supplied is small, such that the effect of preventing deactivation of the molybdenum-based hydrotreating catalyst may be insufficient. In some embodiments, the, the sulfur component may be comprised in an amount of 800 ppm or more, or 8,000 ppm or more, and without limitation, 200,000 ppm or less.

In some embodiments, the second mixed solution may comprise 100 ppm or more of sulfur. As in the case of the sulfur-containing oil, when the sulfur component is comprised in the second mixed solution in an amount of less than 100 ppm, the content of the sulfur component supplied is small, such that the effect of preventing deactivation of the molybdenum-based hydrotreating catalyst may be insufficient. In some embodiments, the sulfur component may be comprised in an amount of 800 ppm or more, or 8,000 ppm or more, and without limitation, 200,000 ppm or less.

In some embodiments, the sulfur-containing oil may be comprised in an amount of less than 0.5 parts by weight with respect to 100 parts by weight of the dehydrated first mixed solution of step S1). In some embodiments, the sulfur-containing oil may be comprised in an amount of less than 0.1 parts by weight, or less than 0.05 parts by weight, and without limitation, more than 0.01 parts by weight. When the sulfur-containing oil is comprised in an amount of less than 0.5 parts by weight, the concentration of chlorine (Cl) and/or nitrogen (N) comprised in the waste plastic pyrolysis oil is diluted, such that a formation rate of an ammonium salt ($NH_4Cl$) may be controlled, and the process stability may be improved.

In some embodiments, the sulfur source may comprise one or two or more sulfur-containing organic compounds selected from a disulfide-based compound, a sulfide-based compound, a sulfonate-based compound, and/or a sulfate-based compound. In some embodiments, the sulfur source may comprise one or a mixture of two or more selected from dimethyl disulfide, dimethyl sulfide, polysulfide, dimethyl sulfoxide (DMSO), methyl methanesulfonate, ethyl methanesulfonate, propyl methanesulfonate, propenyl propenesulfonate, propenyl cyanoethansulfonate, ethylene sulfate, bicyclo-glyoxal sulfate, and/or methyl sulfate. However, these compounds are only presented as examples and the present disclosure is not limited thereto.

In some embodiments, the sulfur-containing organic compound may be comprised in an amount of 0.01 to 0.1 parts by weight with respect to 100 parts by weight of the dehydrated first mixed solution of step S1). In some embodiments, the sulfur-containing organic compound may be comprised in an amount of 0.02 to 0.08 parts by weight, or 0.03 to 0.06 parts by weight. When the sulfur-containing organic compound is comprised in an amount of less than 0.01 parts by weight, the content of the sulfur component supplied is small, such that the effect of preventing deactivation of the molybdenum-based hydrotreating catalyst may be insufficient.

The hydrotreating refers to a hydrogenation reaction that occurs by adding a reaction gas comprising hydrogen gas ($H_2$) to the second mixed solution in which the dehydrated first mixed solution of step S1) and the sulfur source are mixed in the presence of a molybdenum-based hydrotreating catalyst. In some embodiments, the hydrotreating may refer to hydrotreating, which is known in the related art, comprising a hydrodesulfurization reaction, a hydrocracking reaction, a hydrodechlorination reaction, a hydrodenitrogenation reaction, a hydrodeoxygenation reaction, and/or a hydrodemetallization reaction. Through the hydrotreating, impurities comprising chlorine (Cl), nitrogen (N), oxygen (O), and/or some olefins may be removed, and/or other metal impurities may also be removed, and a by-product comprising the impurities is produced.

The by-product is produced by reacting impurities such as chlorine (Cl), nitrogen (N), sulfur (S), and/or oxygen (O) comprised in the waste plastic pyrolysis oil with hydrogen gas ($H_2$). In some embodiments, the by-product may comprise hydrogen sulfide gas ($H_2S$), hydrogen chloride (HCl), ammonia ($NH_3$), water vapor ($H_2O$), and/or the like, and in some embodiments, may comprise unreacted hydrogen gas ($H_2$), and a trace of methane ($CH_4$), ethane ($C_2H_6$), propane ($C_3H_8$), butane ($C_4H_{10}$), or the like.

In some embodiments, the molybdenum-based hydrotreating catalyst may be a catalyst in which a molybdenum-based metal, or a metal comprising one or two or more selected from nickel, cobalt, and tungsten and a molybdenum-based metal, are supported on a support. In some embodiments, the molybdenum-based hydrotreating catalyst has high catalytic activity during hydrotreating, and the molybdenum-based hydrotreating catalysts may be used alone or, if necessary, in the form of a two-way catalyst combined with a metal such as nickel, cobalt, or tungsten.

In some embodiments, as the support, alumina, silica, silica-alumina, titanium oxide, a molecular sieve, zirconia, aluminum phosphate, carbon, niobia, or a mixture thereof may be used, but the present disclosure is not limited thereto.

In some embodiments, the molybdenum-based hydrotreating catalyst may comprise a molybdenum-based sulfide hydrotreating catalyst. For example, the molybdenum-based hydrotreating catalyst may comprise molybdenum sulfide (MoS) and/or molybdenum disulfide ($MoS_2$), but is not limited thereto, and may comprise a known molybdenum-based sulfide hydrotreating catalyst.

In some embodiments, the reaction gas may further comprise hydrogen sulfide gas ($H_2S$). The hydrogen sulfide gas ($H_2S$) comprised in the reaction gas may act as a sulfur source, and may regenerate the activity of the molybdenum-based hydrotreating catalyst deactivated during the refining process together with the sulfur source mixed with the waste plastic pyrolysis oil.

In some embodiments, the hydrotreating may be performed at a pressure of 150 bar or less, or 120 bar or less, or 100 bar or less, and without limitation, 50 bar or more. When the hydrotreating is performed under a pressure condition of more than 150 bar, as ammonia and/or hydrogen chloride are produced in excess during the hydrotreating, an ammonium salt formation temperature increases, and as a result, a differential pressure of a reactor or the like in the process may be easily caused, and the process stability may be significantly reduced. By controlling the content of nitrogen and/or chlorine in the waste plastic pyrolysis oil, the increase in ammonium salt formation temperature may be partially suppressed even under a condition of a pressure of more than 150 bar. However, this case is not appropriate because the waste plastic pyrolysis oil targeted in the refining process according to the present disclosure may be extremely limited.

In some embodiments, the hydrotreating may be performed at a temperature of 150° C. to 500° C. When the temperature satisfies the above range, the hydrotreating efficiency may be improved. In some embodiments, the hydrotreating may be performed at a temperature of 200° C. to 400° C.

In some embodiments, the hydrotreating may be performed in multiple stages, and as an example, may be performed in two stages. When the hydrotreating is performed in two stages, the first stage may be performed at a lower temperature than the second stage. In this case, the first stage may be performed at a temperature of 150° C. to 300° C., or 200° C. to 250° C., and the second stage may be performed at a temperature of 300° C. to 500° C., or 350° C. to 400° C., but the present disclosure is not limited thereto.

In some embodiments, the method for refining waste plastic pyrolysis oil may further comprise, after step S2), subjecting a stream comprising the refined oil from which the impurities are removed to gas-liquid separation and then washing the gas-liquid separated stream with water.

In some embodiments, the stream comprising the refined oil from which the impurities are removed may comprise hydrogen chloride, ammonia, unreacted hydrogen gas, and the like, in addition to the refined oil from which the impurities are removed discharged from a rear end of the reactor where step S2) is performed.

Through the gas-liquid separation, from the stream comprising the refined oil from which the impurities are removed, ammonia and hydrogen chloride produced by the hydrotreating may be removed, and unreacted hydrogen gas may be recovered.

In some embodiments, the gas-liquid separation may be performed by a method known in the art using a separator, but is not particularly limited.

In some embodiments, the gas-liquid separation may be performed once, two to four times, or three or four times, or four times. When the above range is satisfied, the formation of the ammonium salt may be minimized even under a low-temperature condition for oil-water separation because the refined oil comprises traces of $NH_3$ and/or HCl. In addition, oil refining and petrochemical processes using the refined oil as a feedstock may be stably performed without adding an additional salt remover to the refined oil later.

In some embodiments, a gas stream produced as a result of the gas-liquid separation may comprise off-gas comprising light hydrocarbons, hydrogen sulfide, ammonia, hydrogen chloride, and/or the like, and/or unreacted hydrogen gas. According to a method known in the art, the off-gas and the unreacted hydrogen gas are separated, and the separated unreacted hydrogen gas is recirculated in the process, and the off-gas is treated through a step described below and may be used as a feedstock or discharged into the atmosphere.

In some embodiments, through the water washing, a salt comprised in the gas stream may be dissolved and removed, and/or salt formation may be suppressed by dissolving gas that may form a salt. The water washing may be performed by a method known in the art, but is not particularly limited.

In some embodiments, the water washing may be performed once, two to four times, or two or three times. When the above range is satisfied, the salt removal and salt formation suppression effect may be sufficiently exhibited, such that high-quality refined oil may be obtained, and the process stability may be secured.

In some embodiments, the method for refining waste plastic pyrolysis oil may further comprise, after the subjecting of the stream comprising the refined oil from which the impurities are removed to the gas-liquid separation and then the washing of the gas-liquid separated stream with water: combusting the separated off-gas; and processing uncombusted off-gas.

In some embodiments, the off-gas may comprise C1-C4 light hydrocarbons, hydrogen sulfide ($H_2S$), ammonia ($NH_3$), and/or the like. Therefore, in order to use the off-gas as fuel, it is required to combust the off-gas to remove hydrogen sulfide ($H_2S$), ammonia ($NH_3$), and the like. Exhaust gas comprising sulfur dioxide ($SO_2$), nitrogen dioxide ($NO_2$), and the like, produced by combustion of the off-gas may be discharged into the atmosphere after performing caustic scrubbing to meet emission standards.

In some embodiments, after the combusting of the separated off-gas, uncombusted off-gas may be discharged as wastewater by being subjected to sour water stripping, adsorption, biological treatment, oxidation, amine scrubbing, or caustic scrubbing.

In some embodiments, the present disclosure provides a device for refining waste plastic pyrolysis oil, the device comprising: a dehydrator performing dehydration by applying a voltage to a first mixed solution obtained by mixing waste plastic pyrolysis oil, washing water, and a demulsifier to form a dehydrated first mixed solution; and a hydrotreating reactor into which the dehydrated first mixed solution and hydrogen gas are introduced and in which refined oil from which impurities are removed is produced by hydrotreating the first mixed solution in the presence of a hydrotreating catalyst.

The contents described for the method for refining waste plastic pyrolysis oil may be equally applied to the description of the device for refining waste plastic pyrolysis oil to the extent of overlap.

In some embodiments, the dehydrator may be provided with a vertical electrode. The number of vertical electrodes provided in the dehydrator according to an exemplary embodiment of the present disclosure may be at least two, four or more, or six or more, and as an upper limit, twenty or fewer, but is not limited thereto.

In some embodiments, the dehydrator may comprise a coalescer therein. The coalescer is a device that collects fine droplets to form large droplets, and any device commonly used in the industry may be used. The coalescer is not particularly limited.

In some embodiments, the dehydrated first mixed solution may be introduced into the coalescer, and an additionally dehydrated first mixed solution may be produced. When a dehydrator comprising the coalescer is used, the additionally dehydrated first mixed solution is introduced into the hydrotreating reactor together with the hydrogen gas.

In some embodiments, the device for refining waste plastic pyrolysis oil may further comprise a separator for subjecting the refined oil from which the impurities are removed to gas-liquid separation, the refined oil being produced in the hydrotreating reactor.

The number of separators according to an exemplary embodiment of the present disclosure may be two to four, or three or four, or four. When the above range is satisfied, the formation of the ammonium salt may be minimized even under a low-temperature condition for oil-water separation because the refined oil comprises traces of $NH_3$ and/or HCl. In addition, oil refining and petrochemical processes using the refined oil as a feedstock may be stably performed without adding an additional salt remover to the refined oil later.

In some embodiments, the device for refining waste plastic pyrolysis oil may further comprise a recycle gas compressor recovering unreacted hydrogen gas from the separated gas stream from the separator and adding the recovered unreacted hydrogen gas to the hydrotreating reactor.

Hereinafter, the method and device for refining waste plastic pyrolysis oil according to the present disclosure will be described in more detail with reference to Examples. However, the following Examples are only reference examples for describing the present disclosure in detail, and the present disclosure is not limited thereto and may be implemented in various forms. Unless otherwise defined, all technical terms and scientific terms used herein have the same meaning as commonly understood by those skilled in the art to which the present disclosure pertains. In addition, the terms used in the present disclosure are only to effectively describe specific Examples, but are not intended to limit the present disclosure.

Example 1

Waste plastic pyrolysis oil, washing water, and polyethylene glycol having a weight average molecular weight of 500 were added to a dehydrator under conditions of 150° C. and 10 bar at a volume ratio of 1:0.25:0.0001, and stirring was performed, thereby preparing a first mixed solution. The first mixed solution was separated into oil and water by applying an alternating voltage of 15 kV through a vertical electrode, and then dehydration was performed by removing the water layer to produce the dehydrated first mixed solution.

At this time, in the waste plastic pyrolysis oil, the content of moisture was about 5,000 ppm or more, and impurities at high concentrations: 500 ppm or more of nitrogen (N), 200 ppm or more of chlorine (Cl), and 20 vol % or more of olefins were contained.

A second mixed solution was prepared by mixing dimethyl disulfide in an amount of 0.04 parts by weight with respect to 100 parts by weight of the dehydrated first mixed solution, and then the second mixed solution was hydrotreated under conditions of 300° C. and 70 bar, thereby producing refined oil from which impurities were removed.

Examples 2 and 3

Refined oil from which impurities were removed was produced under the same conditions as those in Example 1, except that the waste plastic pyrolysis oil, washing water, and polyethylene glycol were added to the dehydrator at the volume ratio shown in Table 1.

Example 4

Refined oil from which impurities were removed was produced under the same conditions as those in Example 1, except that an alternating voltage was applied through a horizontal electrode in Example 1.

Example 5

Refined oil from which impurities were removed was produced under the same conditions as those in Example 1, except that the dehydration of the first mixed solution was performed under a temperature condition of 120° C. in Example 1.

Example 6

Refined oil from which impurities were removed was produced under the same conditions as those in Example 1, except that the waste plastic pyrolysis oil and polyethylene glycol were added at a volume ratio of 1:0.00001 in Example 5 and the hydrotreating was performed under a condition of a pressure of 180 bar.

Example 7

Refined oil from which impurities were removed was produced under the same conditions as those in Example 1, except that after the first mixed solution was dehydrated, the first mixed solution was additionally dehydrated through a coalescer.

Comparative Example 1

Refined oil from which impurities were removed was produced under the same conditions as those in Example 1, except that the washing water was not added in Example 1.

Comparative Example 2

Refined oil from which impurities were removed was produced under the same conditions as those in Example 1, except that the polyethylene glycol was not added in Example 1.

Comparative Example 3

Refined oil from which impurities were removed was produced under the same conditions as those in Example 1, except that the voltage was not applied in Example 1.

Comparative Example 4

Refined oil from which impurities were removed was produced under the same conditions as those in Example 1, except that dimethyl disulfide was not mixed with the dehydrated first mixed solution in Example 1.

Evaluation Examples

Measurement Methods

After the dehydration process was completed, the contents of moisture and chlorine in the obtained mixed solution and the content of chlorine in the finally obtained refined oil were measured through ICP and XRF analysis methods, and the measured results are shown in Table 1.

The catalytic activity duration was measured and expressed in hours based on the time point when the content of nitrogen in the refined oil exceeded 10 ppm by performing a Total Nitrogen & Sulfur (TNS element) analysis.

In addition, the refining process of each of Examples and Comparative Examples was operated for three months, and a particle adhesion rate was measured according to the following Equation 1.

Particle adhesion rate (%)=(Amount of impurity particles adhering to electrode/Amount of impurity particles in pyrolysis oil)×100     [Equation 1]

The measurement results are shown in Table 1.

TABLE 1

| | | Example 1 | Example 2 | Example 3 | Examle 4 | Example 5 | Example 6 |
|---|---|---|---|---|---|---|---|
| Dehydration | Washing water (volume ratio) | 0.25 | 0.50 | 0.25 | 0.25 | 0.25 | 0.25 |
| | Demulsifier (volume ratio) | 0.0001 | 0.0001 | 0.00001 | 0.0001 | 0.0001 | 0.00001 |
| | Temperature (° C.) | 150 | 150 | 150 | 150 | 120 | 120 |
| | Pressure (bar) | 10 | 10 | 10 | 10 | 10 | 10 |
| | Voltage Type | AC | AC | AC | DC | AC | AC |
| | Electrode | Vertical | Vertical | Vertical | Horizontal | Vertical | Vertical |
| | Presence or absence of coalescer | X | X | X | X | X | X |
| Hydrotreating | Whether sulfur source is mixed or not | ○ | ○ | ○ | ○ | ○ | ○ |
| | Temperature (° C.) | 300 | 300 | 300 | 300 | 300 | 300 |
| | Pressure (bar) | 70 | 70 | 70 | 70 | 70 | 180 |
| | Content of moisture after dehydration (ppm) | 592 | 783 | 672 | 595 | 721 | 895 |
| | Content of Cl after dehydration (ppm) | 562 | 552 | 614 | 560 | 646 | 739 |
| | Catalytic activity duration (hr) | >720 | >720 | >720 | >720 | >720 | >720 |
| | Content of Cl in refined oil (ppm) | <1 | <1 | <1 | <1 | <1 | <1 |
| | Particle adhesion rate (%) | 0.20 | 0.18 | 0.20 | 3.5 | 0.21 | 0.20 |

| | | Example 7 | Comparative Example 1 | Comparative Example 2 | Comparative Example 3 | Comparative Example 4 |
|---|---|---|---|---|---|---|
| Dehydration | Washing water (volume ratio) | 0.25 | — | 0.25 | 0.25 | 0.25 |
| | Demulsifier (volume ratio) | 0.0001 | 0.0001 | — | 0.0001 | 0.0001 |
| | Temperature (° C.) | 150 | 150 | 150 | 150 | 150 |
| | Pressure (bar) | 10 | 10 | 10 | 10 | 10 |
| | Voltage Type | AC | AC | AC | — | AC |
| | Electrode | Vertical | Vertical | Vertical | — | Vertical |
| | Presence or absence of coalescer | ○ | X | X | X | X |
| Hydrotreating | Whether sulfur source is mixed or not | ○ | ○ | ○ | ○ | X |
| | Temperature (° C.) | 300 | 300 | 300 | 300 | 300 |
| | Pressure (bar) | 70 | 70 | 70 | 70 | 70 |

TABLE 1-continued

|  | | | | | |
|---|---|---|---|---|---|
| Content of moisture after dehydration (ppm) | 510 | 2485 | 4416 | 3840 | 610 |
| Content of Cl after dehydration (ppm) | 483 | 1024 | 1118 | 1105 | 564 |
| Catalytic activity duration (hr) | >720 | <576 | <576 | <576 | <336 |
| Content of Cl in refined oil (ppm) | <1 | 13.7 | 18.0 | 16.8 | 11.7 |
| Particle adhesion rate (%) | 0.18 | 0.24 | 0.21 | — | 0.20 |

As shown in Table 1, in Comparative Examples 1 to 3, the addition of washing water, addition of demulsifier, and application of voltage were set differently from Examples, and as a result, moisture and Cl removal was poor. Accordingly, the catalyst was adversely affected in the hydrotreating step, and the content of Cl in the finally obtained refined oil was high. In Comparative Example 4, although moisture and some impurities in the waste plastic pyrolysis oil were sufficiently removed in the dehydration step, the hydrotreating catalyst was deactivated within a short time due to an insufficient content of sulfur, and thus, the refining process was difficult to maintain for a long period of time.

However, in Examples 1 to 7 according to the method for refining waste plastic pyrolysis oil of the present disclosure, a significant amount of moisture contained in the waste plastic pyrolysis oil was removed through the dehydration step, and a sulfur source was added, and as a result, the activity of the hydrotreating catalyst was maintained for a remarkably long time. In addition, as some water-soluble impurities were preemptively removed in the dehydration step and the excellent activity of the catalyst was maintained for a long period of time, high-quality refined oil having a significantly low content of impurities was obtained.

When an alternating voltage was applied using a vertical electrode, the adhesion rate of impurity particles derived from char in the pyrolysis oil to the electrode surface was significantly low even when the process was continued for longer than three months. Through this, it was appreciated that when an alternating voltage was applied or a vertical electrode was used, there was no need to stop the process for washing the inside of the reactor, and as a result, more excellent process efficiency was exhibited.

In the case of Example 6, although the dehydration result was poor compared to other Examples, the content of Cl impurities in the refined oil was significantly low as the hydrotreating was performed under a high pressure condition. However, since ammonia and hydrogen chloride were produced in excess due to the high pressure, a relatively large amount of ammonium salt was formed even at the temperature at which the hydrotreating was performed.

In Example 7, as the additional dehydration was performed using a coalescer, the content of moisture and chlorine after the dehydration were lower than those in other Examples, and therefore, it could be expected that the activation time of the catalyst, the process stability, and the refined oil quality were relatively superior to those in other Examples.

As shown above, the method and device for refining waste plastic pyrolysis oil according to the present disclosure may prevent or minimize formation of an ammonium salt (NH$_4$Cl) and may prevent the adhesion phenomenon of impurity particles in a refining process of waste plastic pyrolysis oil containing impurities including chlorine and nitrogen.

The method for refining waste plastic pyrolysis oil according to the present disclosure may prevent deactivation of the catalyst due to moisture, such that the refining efficiency may be excellent, and the process may be operated for a long period of time.

The method and device for refining waste plastic pyrolysis oil according to the present disclosure may provide waste plastic pyrolysis oil that has significantly low contents of impurities such as chlorine, nitrogen, oxygen, metals, and/or olefins, and has excellent quality, and thus, may be used as a feedstock for blending with existing petroleum products or oil refining and petrochemical processes.

The method and device for refining waste plastic pyrolysis oil according to the present disclosure may be used in production of eco-friendly oil refining and petrochemical products using waste plastics.

Although the exemplary embodiments of the present disclosure have been described, the present disclosure is not limited to these exemplary embodiments, and those skilled in the art will appreciate that various modifications and alterations may be made without departing from the concept and scope of the claims described below.

What is claimed is:

1. A method for refining waste plastic pyrolysis oil, the method comprising the steps of:
    S1) mixing waste plastic pyrolysis oil, washing water, and a demulsifier to form a first mixed solution and dehydrating the first mixed solution by applying a voltage to form a dehydrated first mixed solution; and
    S2) mixing the dehydrated first mixed solution and a sulfur source to obtain a second mixed solution and hydrotreating the second mixed solution to produce a stream comprising a refined oil from which sulfur and nitrogen impurities have been removed.

2. The method of claim 1, wherein the waste plastic pyrolysis oil is included in a greater volume than the washing water.

3. The method of claim 1, wherein a volume ratio of the waste plastic pyrolysis oil to the washing water is 1:0.001 to 0.5.

4. The method of claim 1, wherein a volume ratio of the waste plastic pyrolysis oil to the demulsifier is 1:0.000001 to 0.001.

5. The method of claim 1, wherein the voltage is applied as an alternating current or a combination of an alternating current and a direct current.

6. The method of claim 1, wherein the voltage is applied through a vertical electrode.

7. The method of claim 1, further comprising, after the application of the voltage in step S1), removing a rag layer from the first mixed solution.

8. The method of claim 1, wherein step S1) is performed under a temperature condition of 20° C. to 300° C.

9. The method of claim 1, wherein a ratio of a content of moisture in the waste plastic pyrolysis oil to a content of moisture in the dehydrated first mixed solution in step S1) is 1:0.0001 to 0.9.

10. The method of claim 1, wherein the dehydrated first mixed solution is additionally dehydrated by condensation of moisture.

11. The method of claim 1, wherein a weight ratio of nitrogen to chlorine in the second mixed solution is 1:1 to 10.

12. The method of claim 1, wherein the sulfur source comprises sulfur-containing oil.

13. The method of claim 12, wherein the sulfur-containing oil is included in an amount of less than 0.5 parts by weight with respect to 100 parts by weight of the dehydrated first mixed solution of step S2).

14. The method of claim 1, wherein the sulfur source comprises one or more sulfur-containing organic compounds selected from a disulfide-based compound, a sulfide-based compound, a sulfonate-based compound, and/or a sulfate-based compound.

15. The method of claim 1, wherein the hydrotreating is performed with a catalyst comprising molybdenum.

16. The method of claim 15, wherein the catalyst comprises molybdenum metal and optionally one or more metals selected from nickel, cobalt, and tungsten on a support.

17. The method of claim 15, wherein the hydrotreating catalyst comprises molybdenum sulfide (MoS) and/or molybdenum disulfide ($MoS_2$).

18. The method of claim 1, wherein the hydrotreating is performed under a pressure condition of 50 bar to 150 bar.

19. The method of claim 1, further comprising, after step S2), subjecting the stream comprising the refined oil to gas-liquid separation to produce a gas stream and washing the gas stream with water.

* * * * *